United States Patent [19]
Cummings

[11] Patent Number: 6,141,796
[45] Date of Patent: Nov. 7, 2000

[54] USE OF CARBONACEOUS FUELS

[75] Inventor: Donald R. Cummings, Ultimo, Australia

[73] Assignee: Isentropic Systems Ltd., Sydney, Australia

[21] Appl. No.: 09/000,316

[22] PCT Filed: Aug. 1, 1996

[86] PCT No.: PCT/AU96/00483

§ 371 Date: May 20, 1998

§ 102(e) Date: May 20, 1998

[87] PCT Pub. No.: WO97/05216

PCT Pub. Date: Feb. 13, 1997

[51] Int. Cl.[7] ........................................................ F02G 3/00
[52] U.S. Cl. .......................................... 1/39.12; 60/39.464
[58] Field of Search ............................. 60/39.12, 39.464; 48/197 R, 210

[56] References Cited

U.S. PATENT DOCUMENTS 4,866,928  9/1989  Raiko ...................................... 60/39.12

*Primary Examiner*—Noah P. Kamen
*Attorney, Agent, or Firm*—Sheridan Ross P.C.

[57] ABSTRACT

A process for the gasification of carbonaceous fuels, for, inter alia, the production of chemicals and/or the generation of power is described, characterised in that there is employed, as starting material or part thereof, coal in the form of an aqueous slurry, the aqueous (water) content of the said slurry being at least 55 to 80% by weight. There is also described an apparatus for the burning of carbonaceous fuel, for the production of electrical energy, which apparatus comprises, in interconnected combination, a gasifier into which aqueous coal slurry is introduced, a flow drier/separator wherein materials exiting the gasifier are dried and separated into gaseous component and dried slurry material with feeding of the latter back to the gasifier, a cooling/cleaning device into which the gaseous component from the separator passes and from which, when cleaned, it proceeds for further processing, a gas turbine generation unit in turn comprised of compressor, expansion stage, and generator, and a combustor mechanism; the arrangement being such that combustion and process air passes from the turbine compressor in one stream to the gasifier and in another stream to the combustor, where the latter is combined with the gaseous component from the cooling/cleaning device, the combined gasses then being passed to the expansion stage of the gas turbine generation unit, and converted therein into electrical energy.

14 Claims, 1 Drawing Sheet

USE OF CARBONACEOUS FUELS

FIELD OF THE INVENTION

The problems associated with the use of coals as a gas turbine fuel for high efficiency power generation are well known. This invention is directed to the provision of an improved process and apparatus whereby such problems are overcome or, at the least, considerably alleviated.

BACKGROUND (i) Current conventional wisdom is that direct firing of coal or the use of hot, substantially uncooled gas from a coal gasifier is probably the best means to achieve high generation efficiencies with coal-fired gas turbine systems. However, it is known that ash particles, vaporised salts, and sulphur compounds which result from direct coal firing or from the use of hot gases from coal gasifiers, are difficult to eliminate without substantial cooling of the gases.

(ii) It is known that cooling and washing of gas leaving coal gasifiers can substantially remove all the compounds which give rise to problems with high temperature components in gas turbines. However it is accepted that such a cooling and washing produces a very dilute fuel gas heavily contaminated with water vapour which is generally regarded as being unsuitable for combustion in conventional gasifiers. In some currently proposed schemes for Integrated Gasification Combined Cycle processes (known in the art as IGCC processes), fuel gas produced by simple total or partial adiabatic cooling of gasifier product gas also lowers the flame temperature of the diluted fuel gas to the point where stable combustion and the high combustion temperatures required by high efficiency IGCC system designs are not attainable with the highly water vapour-diluted coal-based fuel gases.

(iii) It is generally accepted that, notwithstanding the known problems of added complexity caused by the introduction of additional equipment, efficient coal firing of gas turbines can only be achieved with the use of combined cycles, ie. the incorporation of a waste heat boiler in the turbine exhaust and the use of a steam turbine cycle.

(iv) It is also conventional wisdom to consider that higher compression ratio turbines are the optimum means to achieve high efficiency with coal-fired gas turbine systems even though such turbines present known problems associated with the use of high compression ratios. The problems of drying and gasification of carbonaceous fuels and particularly high water content carbonaceous fuels such as lignite, when used as a power generation fuel or feedstock for synthesis gas production, are also well known.

(v) Prior Art Proposal

The foregoing problems are outlined in a recent prior art development which proposes a means and process whereby solid moisture-containing coal can be utilised to generate power. According to this proposal, the process cannot however readily deal with a solid lignite having a significant moisture content if it is converted into a water-lignite slurry typically containing 25% or possibly less solids (wet basis). Even though the higher water content lignite could be more readily handled, it was apparently considered that loss of efficiency of the overall process and also the known problems in combusting water vapour laden, very low heating value fuel gas in gas turbines would be too disadvantageous. Consequently, the use of such a coal slurry was apparently considered to be not technically feasible and to be likely to result in major combustion problems, and inability to achieve a high combustion temperature with consequent low power generation efficiency.

In this (solid fuel) proposal, the fuel gas leaving the drier integrated with the gasification process is to be further adiabatically cooled by the injection of water and the saturated gas is then washed or treated by known means to remove particulates, and is then further cooled to reduce the water content of the gas such that it is increased in calorific value and can be used in known combustion systems. Gas treatment at water saturation temperature can remove particulates and may also enable the removal of sulphur compounds by known means following that stage. This final cooling has the inherent disadvantage of removing water vapour at combustion pressure which could be heated in the combustion stage and a significant part of its inherent energy recovered in the expansion stage of the turbine. By condensing the water vapour this inherent energy is wasted and the cooling stage requires extra equipment and cooling media to remove the water vapour and a process plant to handle the resultant condensate.

The cooling of the gasifier exit gas by simultaneous drying of the coal feed puts additional water vapour into the fuel gas, and further adiabatic cooling by water addition and water washing for removal of solid particles and possibly sulphur compounds after the drying stage puts water vapour at combustion stage pressure (which could increase the mass flow to the combustion and final expansion stage thereby increasing the rated power output of the turbine system). However the additional water content added by such cooling has the problem of making the gas unsuitable for combustion and for the achievement of high combustion temperatures such as in excess of 1,100° C. and preferably above 1,200° C.

It is also known, and referred to in this prior art, that it has been proposed that wastes such as sewerage sludge can be dried by contacting said wastes with the hot gases leaving a coal gasifier. However such a system also suffers from the limitation that the amount of water which can be evaporated is limited by known gas turbine and turbine combustion systems. These limitations also constrain the use of simple water spray and gasifier exit gas cooling and ash removal systems.

The problems of NOX (oxides of nitrogen) formation in fossil fuel fired gas turbines are well known. The prior art proposal envisages the use of conventional known combustion systems which, even with best practice combustor design, would result in a NOX content in the exhaust gas of in excess of 10 ppm (and probably about or in excess of 20 ppm).

Further Known Problems (vi) It is known that oxygen should preferably be used for coal gasification where the product gas is to be used to synthesise methanol or methanol derivatives. However for such gasification processes, the reduced flow of produced gas compared to coal feed rate makes integrated drying and gasification difficult. It has been believed that, due to lack of sufficient hot gas needed to dry the coal prior to gasification, the use of oxygen-blown gasifier gas to dry a significantly wet lignite feed cannot be achieved.

(vii) It is also known that gasification processes developed for bituminous coal—such as the processes commercially known as U-Gas and Shell Totzec which operate at pressure, require a dry coal feed and therefore cannot use a pumped water/coal slurry—require the use of lock hopper systems to pressurise the coal prior to being fed to the gasifier. The gas mixture in the gasifier is flammable and toxic and such feed systems require special equipment to recover and use these gases.

(viii) A further known problem with IGCC cycles, particularly air blown gasifier processes, is that, to enable conventional burner systems to operate satisfactorily, it is necessary to operate the gasifier at a significantly higher pressure than the pressure to which the combustion air is compressed.

SUMMARY OF THE INVENTION

Against the cumulative background of the foregoing, the invention of this application is predicated upon our finding that, surprisingly, against all expectations, coal material with a substantial aqueous (water) content can be utilised as the basic starting material in the gasification of coal fuel and the generation of power. Accordingly, the invention, in its broadest aspect, provides a process for the gasification of carbonaceous fuels, for, inter alia, the production of chemicals and/or the generation of power characterised in that there is employed, as starting material or part thereof, coal in the form of an aqueous slurry, the aqueous (water) content of the said slurry being at least 55% by weight.

In a related aspect, the invention further provides a process a process for the gasification of carbonaceous fuels, for, inter alia, the production of chemicals and/or electrical energy characterised in that (i) coal, in the form of an aqueous slurry having a water content of at least 55% by weight, is introduced, with hot gas produced in a coal gasifier stage, to a drying stage, (ii) the resultant slurry mixture is dried in the said drying stage by the adiabatic cooling of the hot gas and evaporation of the water, the thus dried coal and the cooled humidified gas being separated with return of the dried coal to the hot-gas producing gasifier stage, and (iii) the cooled humidified gas is further cooled, cleaned and utilised in the production of chemicals and/or electrical energy.

Preferably, the aqueous content of the slurry is at least 65% by weight, and optimally it is in the range 70–80% by weight. The coal slurry may be composed in whole or in part of a slurry further comprising coal washery tailings residue. In a further (effluent eliminating) aspect, the aqueous medium, for the coal slurry, may be comprised, in whole or in part, of waste water, sewerage and the like.

Relatedly the invention also provides apparatus for carrying out the above-defined process. In one aspect the apparatus comprises, in interconnected combination, a gasifier into which aqueous coal slurry is introduced, a flow drier/separator wherein materials exiting the gasifier are dried and separated into gaseous component and dried slurry material with feeding of the latter back to the gasifier, and a cooling/cleaning device into which the gaseous component from the separator passes and from which, when cleaned, it proceeds to a recuperator turbine/combustion arrangement for power generation.

In a further aspect, the invention also provides apparatus, for use in carrying out the above defined process which comprises, in interconnected combination, a gasifier into which aqueous coal slurry is introduced, a flow drier/separator wherein materials exiting the gasifier are dried and separated into gaseous component and dried slurry material with feeding of the latter back to the gasifier, a cooling/cleaning device into which the gaseous component from the separator passes and from which, when cleaned, it proceeds for further processing, a gas turbine generation unit in turn comprised of a compressor, expansion stage, and generator, and, a combustor mechanism, the arrangement being such that combustion and process air passes from the turbine compressor in one stream to the gasifier and in another stream to the combustor, where the latter is combined with the gaseous component from the cooling/cleaning device, the combined gasses then being passed to the expansion stage of the gas turbine generation unit, and converted therein into electrical energy.

In further preferred aspects of the invention (elaborated in detailed description below)

The lignite/brown coal/high water content semi bituminous coal being fed to the drying stage of the process is fed by pumping, or other known means, as a slurry or paste of size reduced, but otherwise untreated "as mined" lignite or coal. This feed material has a water content in the range 70–80% by weight of water.

Combustor system for the turbine comprises two combustion stages, the first stage being a combustor in which sufficient fuel gas is intimately mixed with the combustion air prior to the first stage of combustion to give a temperature in excess of 800° C. and below 1,000° C. at which temperature the mixture leaves the first stage. The remaining part of the fuel (as required) is added under conditions which ensure maximum mixing and turbulence such that free radical induced rather than flame induced combustion is favoured. An example of such a combustor is described in the specification of application PCT/AU95/00719 which is incorporated herein by reference.

The fuel gas passing to the second stage of combustion is catalytically reacted (e.g. per medium of known sulphur tolerant shift catalysts) to convert at least part of the carbon monoxide and water vapour in the gas stream to hydrogen and carbon dioxide before passing to the said second combustion stage. This further increases its temperature and hydrogen content to ease its combustion in lean phase mix with combustion gases by means of free radicle-induced combustion.

The gases leaving the coal gasification stage, or at least the greater part thereof, are used to dry the coal (lignite) water slurry and the gases are then further cooled by evaporative cooling by further water addition, water washing being thereby used to remove solid particles from the gas (by known means such as venturi scrubbers, water sprays, coalescers, demisters, electrostatic precipitators). Thereafter the gases can be preheated by heat exchange with exhaust gases leaving the expansion stage of the gas turbine before being used as fuel gas in the turbine's combustion system.

Salts may be removed by solution in the wash water and fuel and ash components may be separated by known means. Unused fuel may be recovered as a water/fuel slurry and recycled with the incoming fuel/water slurry feed.

The water content in the coal may be due in whole or in part to the addition of wastes such as sewerage waste or other suitable wastes requiring disposal which may be added together with the coal or lignite fuel.

The process of this invention is also suitable for the use of lignite/water slurries where the lignite has been pretreated by the Hydro Thermal Dewatering process (known as the HTD process). With the use of the denser slurry produced by the HTD process, an integrated drying and gasification process producing power in accordance with this invention can dry a feed coal and water slurry in excess of that required for power generation and can produce a side-stream of dried coal for oxygen-based gasifiers producing synthesis gas for coal processing plant such as hydrogenation to produce liquid fuels or other uses such as a low moisture high quality briquette fuel.

By means of using the combustor system specified in this invention the pressure of the air passing to the gasifier may be no more than 4.0 bar and possibly less than 2 bar above the pressure of the air passing to the combustor.

DETAILED DESCRIPTION OF THE INVENTION

Figure 1:
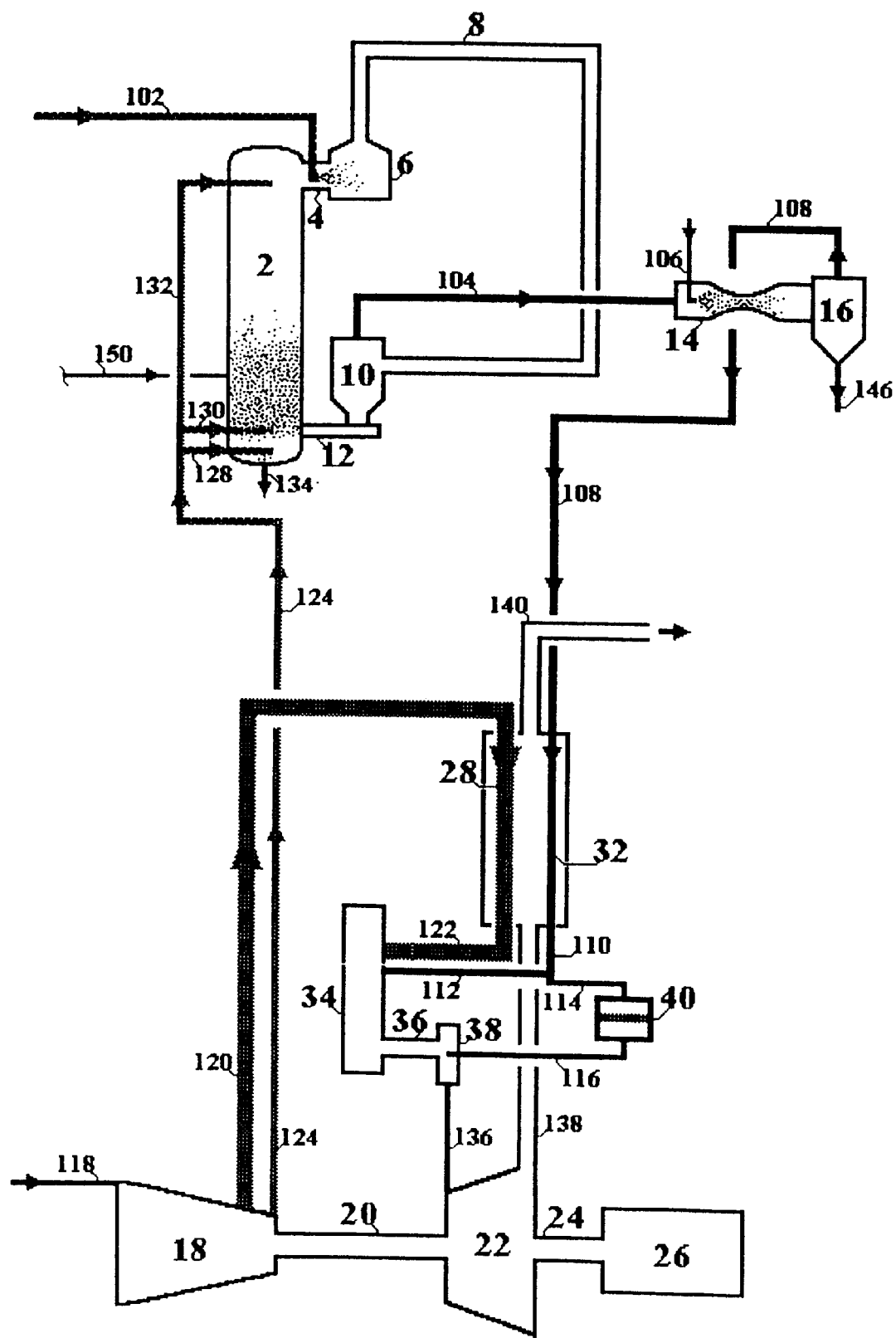
FIG. 1 is a schematic representation of a preferred embodiment of a process for the gasification of carbonaceous fuels.

Attention is now directed to the accompanying drawing wherein FIG. 1 depicts, schematically, a preferred embodiment of the invention. In the figure, the apparatus of the invention, which is used in the performance of the process of the invention is illustrated.

In the preferred embodiment, the aqueous coal slurry is an aqueous slurry of lignite, lignite being a well-known brown coal with a carbon content within the range 25–45%. In its detail (namely particle size, water content et al) the lignite slurry is discussed further below. It is re-emphasised that the figure is a schematic illustration and is to be understood as such.

In the drawing item 2 is an air blown pressurised lignite gasifier (such as a Winkler gasification device) and item 4 is an outlet duct of the gasifier to which additional air or oxygen may be optionally added via pipeline 132. Items 6, 8 and 10 are components of an entrained flow drier of known construction in which 6 is an entrainment mixing vessel in which fluidisation and conveying of lignite is initiated, 8 is an entrainment flow drying tube or tubes, and 10 is a separator or separators such as a cyclone separator or separators. Item 12 denotes a dried lignite feeding device which may be a screw conveyor, lock hopper mechanism, injector or any combination of such known devices, which can inject dried lignite into the gasifier which is at a higher pressure than the lignite recovered from separator 10.

Item 14 is an adiabatic cooling device such as a venturi scrubber, which is capable of cooling hot and dust laden gases to their dew point, coagulating mist particles and wetting dust particles in the gas stream. Item 16 is a separator, such as a cyclone separator and mist elimination system or electrostatic precipitator or the like, which may incorporate water spraying or partial condensation to provide a clean water wash capable of removing substantially all of the dust particles and soluble salts as a solution or slurry which is separated from the gas stream within separator 16 and removed via pipeline 146.

The apparatus also comprises a recuperated turbine and combustion system which will now be described.

Items 18, 20, 22, 24 and 26 depict a gas turbine power generation unit in which 18 is the air compression stage, 22 is the expansion stage, 26 is the generator and 20 and 24 are respective connecting shafts between 18 and 22 and 22 and 26. The expansion stage, 22 may be a split or single shaft unit. Items 28 and 32 are sets of recuperators. In the combustion system, item 34 is a first stage combustion vessel (combustor), which may be of the type described in the copending application referred to above. Item 36 is an interconnecting duct and item 38 is a second stage combustion vessel (combustor) in which combustion is achieved as described hereafter.

The gas turbine may have a compression ratio less than 35/1, for example below 17/1, and may be as low a 4/1.

Item 40 is a catalytic system incorporating known (e.g. sulphur tolerant) shift catalysts mounted in a vessel such that part of the carbon monoxide in the gas stream entering the vessel reacts with the water vapour in the gas stream to form additional hydrogen and carbon dioxide.

Air from the gas turbine compressor 18, at a lower pressure than the air in pipeline 124, is withdrawn from the compressor and fed via pipeline or duct 120 into the recuperator sets 28 and 32 and passes via pipeline or duct 122 to the first stage combustor, 34.

Steam is added to the gasifier, 2, by known means via pipeline or pipelines 150 and dried lignite is fed via the feeding device 12. Ash and partially combusted lignite are withdrawn by known means via extract system, item 134.

Hot gases typically at between 900° C. and 1,000° C. pass from the gasifier 2 to duct 4. As indicated above, additional air and/or oxygen may be added to raise the exit gas temperature via pipeline 132.

The hot gases leaving the gasifier in duct 4 enter mixing vessel 6 and slurried lignite is added via pipeline 102. The lignite slurry in this case is "as mined" lignite reduced in size to particles of dimensions less than 10 mm and suspended in water as a dense slurry or paste having a dry lignite content of about 25% by weight on an "as fed wet" slurry basis. The drying lignite and mixed hot gases and water vapour enter 10 in which the greater part of the dried lignite is removed and pass to feeding device 12 in which the lignite is conveyed at a controlled rate and increased in pressure such that lignite passes to the gasifier, 2. Part of the steam shown as entering the gasifier may be used to assist in the conveyance and dispersion of the lignite from device 12 to gasifier 2.

Any leakage of gas via the feeding device 12 would pass to separator 10 and would be recovered as gas turbine fuel.

Gas from the combined gasification and drying stages leave separator 10 via pipeline or duct 104 and enters cooling device 14 in which water is added via pipeline 106 to cool and saturate the gases to or slightly below their adiabatic dew point. The excess water plus dissolved and suspended salts and ash from the lignite plus unburnt or partially burnt lignite are removed via pipeline 146. The material leaving via the pipeline may be treated by known means to extract ash and to remove and recycle the unburnt and partially burnt lignite. All or part of the lignite may be utilised in the production of the aqueous slurry introduced via pipeline 102. Remaining salts and water may be treated in orthodox fashion.

The cleaned fuel gases, which also contain a substantial amount of water vapour and inert gases such as nitrogen and carbon dioxide, leave cooling device 14 via pipeline 108 and pass to the recuperator 32 in which the gas is preheated for passage to and use as fuel in the above-mentioned gas turbine combustor system (34, 36 and 38, 18, 20, 22, 24, 26).

Combustion and process air for the gas turbine system enters the system via duct 118 and is compressed in compressor 18 such that compressed combustion air is withdrawn via pipeline 120 and preheated in recuperators 28 and 32 and then passes via duct 122 to the first stage combustor 34.

Some air at a higher pressure than in pipeline 120 is withdrawn via pipeline 124 and passes via this pipeline to the gasifier in which the air is injected into the gasifier via pipelines 128, 130 and (abovementioned) 132.

Air stream 124 may be recuperated prior to passage to the gasifier via a recuperator in parallel with recuperators 28/32 so as to increase gasification temperature. In this embodiment total gasifier temperature may be raised, or alternatively, part of the air is pre-heated and used to partially fuse and agglomerate coal in a fluid bed gasifier.

The combustor 34 is operated so as to use all or the greater part of the air preheated in recuperators 28 and 32 and entering the combustor via pipeline 122, and part of the preheated fuel gas from recuperators 28 and 32 entering the combustor via pipeline 110 and 112. The combustion products are then transported to combustor 38 via duct 36 at typically between 850° C. and 1,000° C. The remainder of the fuel passes from pipeline 110 to pipeline 114 and enters catalytic system 40 in which part of the carbon monoxide in the gas is converted by reaction with water vapour in the gas by known catalysts into additional hydrogen with an increase in temperature due to the exothermic nature of the reaction. The hydrogen enriched gas then passes via pipeline 116 to the second stage combustor 38.

The resultant combustion gases leaving combustor 38 are at a temperature in excess of 1,000° C. and preferably above 1,200° C. before entering the expansion stage 22 of the turbine via 136. Net surplus power produced in the expansion turbine 22 passes via shaft 24 to generator 26 in which it is converted predominantly into electrical energy.

The flow of and use of part of the air flow in the gas turbine for purging and cooling operations (such as turbine blades, diaphragms, stator nozzles, shafts, casings and the like) is carried out in known fashion.

In the aforementioned process sulphur in the initial coal feed is removed in or downstream of the gasifier according to methods well known in the art.

In practice, and in brief recapitulation of the above, the first combustor may be fired with fuel oil (diesel) for start up purposes. The aqueous lignite slurry is fed into the outlet duct of the gasifier and steam, air, enriched air or oxygen are fed into the gasifier. As hot gases, typically at a temperature in the range 900 to 1,000° C., leave the gasifier, then traverse the duct through which the slurried lignite enters. The mixture of gases, slurried lignite and drying lignite proceed via the entrained flow dryer sequentially comprised of the entrainment mixing vessel, the flow drying tube and the cyclone separator. The components enter the separator wherein the greater part of the dried lignite is recovered and passes to the screw conveyor or other feeding device for feeding into the gasifier.

Gas leaving the cyclone separator passes via a pipeline to the adiabatic cooling device (venturi scrubber) to which water is added via a pipeline to cool and saturate the gases to or slightly below their adiabatic dew point. Herein, excess water, plus dissolved and suspended salts and ash from the lignite, plus any unburnt or partially burnt lignite, are removed via the exit pipeline. The fuel gases, which have been cleaned by the water from the pipeline entering the venturi scrubber, and which also contain water vapour plus nitrogen and carbon dioxide, leave the scrubber via a pipeline and pass to the recuperators. Here the gas is preheated for use as fuel in the associated gas turbine system which is comprised of the air compressor, expansion stage, generator and respective connecting shafts.

Further associated with the gas turbine system and the recuperators are a first stage combustion vessel and a second stage combustion vessel. The vessels are interconnected by a duct. In the second stage vessel, combustion is achieved by the rapid and intimate mixing of the remaining fuel gas with the hot gases from the recuperators such that predominantly free radical rather than flame initiated combustion takes place.

Combustion and process air, for the gas turbine system, enters the air compressor via an entrance duct and compressed air exits via two pipelines. The exiting air in one pipeline, at a lower pressure than the air in the other pipeline, travels to the recuperators and thence to the first combustor. The higher pressure air passes to the gasifier via the appropriate pipelines.

In addition to the air entering from the compressor via the recuperators, the first combustion vessel is also fed with portion of the abovementioned cleaned preheated fuel gas which has travelled from the venturi scrubber. The combined combustion products from the first combustion vessel are transported to the second vessel via the connecting duct at a temperature typically within the range 850 to 1,100° C. The remainder of the cleaned fuel gas from the scrubber enters a sulphur tolerant catalytic system wherein there is a reaction between the incipient carbon monoxide and water vapour to form additional hydrogen and some carbon dioxide. The thus hydrogen-enhanced gas then passes, via pipeline, to the second combustor vessel.

This second vessel thus contains air and gas from the first combustion vessel and further fuel gas from the gasifier and flow drier (via the scrubber). The combustion gases leaving the second combustion vessel are at a temperature in excess of 1,100° C. whereupon they enter the expansion stage of the turbine system. Power produced therein passes to the generator wherein it is converted into electrical energy.

In the alternative embodiment where all of the cleaned fuel gases passes to the combustor 34, items 38 and 40 need not be utilised. Accordingly, a single combustor may be utilised in this embodiment.

The invention will now be further described with reference to the following Examples 1 and 2.

EXAMPLE 1

In this example, which is carried out with apparatus as schematically illustrated immediately above, parameters are as follows:

(i) A wet lignite and water slurry with 75% (wt/wt) water is fed via feed system 102.

| Lignite analysis (dry and ash free basis) | % (wt/wt) |
|---|---|
| C | 68.2 |
| H2 | 4.4 |
| N2 | 0.6 |
| S | 0.3 |
| O2 | 26.5 |
| 0.7% ash (moisture free basis) | |
| Higher heating value  26.11 MJ/Kg (dry and ash free basis) | |

(ii) The turbine compressor would compress air to 10 atmospheres from which air would be bled for preheating and use in the gasifier and the remaining air would pass through an expansion stage on the same shaft enabling the remaining air to leave at 8 atmospheres for preheating by the recuperator in the gas turbine exhaust gases and use as combustion air.

(iii) The streams of air exiting the compressor are respectively at 8 and 10 atmospheres.

(iv) The temperature of gases entering the combustor and entering the turbine expansion stages are 1,250° C.

(v) Power generation efficiency based on the HHV of the feed lignite (after allowing for recoverable energy in the char and ash residue leaving via extraction systems 134 and 146) is 38%.

(vi) NOX emissions in the flue gases leaving the plant would be less than 5 p.p.m.

EXAMPLE 2

In a further example of drying a coal slurry, gasifying the coal and generating power using bituminous coal, a slagging gasifier using oxygen instead of air for the partial oxidation/gasification of the coal is used. In this case air compressed by the turbines air compression stage is withdrawn at the compressor exit with part of the air being used as feed to the combustor and the remainder being feed an air separation unit. By using the known technique of liquid oxygen pumping the air separation plant can supply oxygen at a pressure above that of the feed air thus eliminating special air compression normally required for the optimal operation of coal gasifiers which are integrated with gas turbine systems.

In this example a nominal 25 MW recuperated gas turbine is used having the following characteristics:

| | |
|---|---|
| Compressor efficiency | 95% |
| Turbine efficiency | 95% |
| Recuperator effectiveness | 90% |
| Cooling air | 13% |
| Turbine inlet temperature | 1,070° C. |
| Compression ratio | 8 to 1 |

At sea level and at 15° C. the turbine is capable of producing 27.2 MW when integrated with coal gasification, coal slurry feed, drying and fuel gas treatment system having the following characteristics.

At sea level and at 150° C. the turbine is capable of producing 27.2 MW when integrated with coal gasification, coal slurry feed, drying and fuel gas treatment system having the follwoing characteristics.

| | |
|---|---|
| Air flow to air separation unit | 9.12 Kg/sec |
| Oxygen produced | 2.09 Kg/sec |
| Oxygen purity | 93% |
| Oxygen pressure | 1800 kPa absolute |
| Coal gasifier | Otto Saarberg type high temperature slagging unit |
| Operating pressure | 1100 kPa absolute |
| Operating temperature | 1,500° C. |
| Coal feed | Bituminous coal as 30% coal wt/wt coal/water slurry |
| Coal analysis (dry) | |
| Volatile matter | 41.5% |
| Ash | 6.0% |
| c.v. (dry and ash free) | 32.2 MJ/kg |
| Ash fusion flow temperature | 1,450° C. |
| Coal feed rate | 2.11 Kg/sec (dry and ash free) |
| Coal slurry pressure | 3,000 kPa absolute |
| Coal slurry temperature | Heated to 220° C. by heat exchange with the turbine exhaust prior to injection into the integrated dryer |

| | |
|---|---|
| Gas analysis (dry) | |
| H2 | 32.3% (volume) |
| CO | 58.8% |
| CO2 | 3.3% |
| N2 | 5.2% |
| H2S + COS | 0.4% |
| Exit drying and gasification stages | |
| Gas (dry) | 4.80 Kg/sec |
| Water vapour | 5.40 Kg/sec |
| Exit final adiabatic cooling and gas purification stage | |
| Gas (dry) | 4.80 Kg/sec |
| Water vapour | 7.39 Kg/sec |
| Fuel gas recuperator effectiveness | 90% |

The pre-heated fuel gas and air are mixed in parallel venturi mixers immediately beneath the lower tube sheet of two combustors each containing 3,000 2 meter long 25 mm outside diameter silicon carbide tubes arranged generally in accordance with co-pending patent PCT AU95/07719. In this case no secondary combustion stage is used.

| | |
|---|---|
| | 27.2 MW |
| Net efficiency | 40% |
| exit NOX | less than 10 p.p.m. |

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for the gasification of carbonaceous fuels for the production of energy, comprising:

(i) introducing an aqueous slurry of coal and hot gas into a drying stage, wherein said aqueous slurry of coal has at least 55% by weight of water, and wherein said hot gas is produced in a hot-gas producing coal gasifier;

(ii) drying said aqueous slurry of coal in said drying stage by the adiabatic cooling of said hot gas and evaporation of the water to produce a dried coal and a cooled humidified gas;

(iii) separating said dried coal and said cooled humidified gas;

(iv) adding said dried coal to said hot-gas producing coal gasifier;

(v) further cooling and cleaning said cooled humidified gas to produce a cleaned gas; and (vi) introducing said cleaned gas to a recuperated turbine and combustor arrangement, wherein said recuperated turbine comprises a compressor unit, an expansion unit and a generator, and wherein said cleaned gas is heated, combined with heated pressurized air from the compressor, combusted in a combustor and transferred to the expansion unit for subsequent power generation.

2. The process of claim 1, wherein said aqueous slurry comprises a slurry comprising coal washery tailings residue.

3. The process of claim 1, wherein said aqueous slurry comprises waste water and sewerage.

4. The process of claim 1, wherein said aqueous slurry is in the form of a pumpable paste.

5. The process of claim 1, wherein said combustor is a two stage combustor, and wherein at least most of said cleaned gas is heated and combined with compressed air in the first stage of said two stage combustor and transferred to the second stage of said two stage combustor, and wherein said compressed air is generated by said compressor unit.

6. The process of claim 5, wherein at least a portion of said cleaned gas directly enters the second stage of the of said two stage combustor via a catalytic system and is admixed with the gas from the first stage of said two stage combustor.

7. The process of claim 6, wherein combustion in the second stage of said two stage combustor is predominantly free radical combustion.

8. The process of claim 5, wherein said hot gas subsequently mixed and combusted in the second stage of said two stage combustor is first reacted over a shift catalyst to maximize the hydrogen content in that part of the hot gas.

9. The process of claim 1, wherein at least a portion of said hot gas produced by said coal gasifier and a subsequent gas purification system is mixed with the preheated air to form a fuel and air mixture below its lower explosive limit and the mixture is then combusted.

10. The process of claim 9, wherein at least a portion of said hot gas is added to and combusted in combustion gases leaving said combustor by mixing the additional hot gas with the hot combustion gases leaving said combustor under highly turbulent conditions so as to minimize flame reactions and maximize free radical induced combustion of the added hot gas.

11. The process of claim 10, wherein the turbine has a compression ratio below 35/1.

12. The process of claim 1, wherein air used for gasification in said coal gasifier is preheated by recuperation with exhaust gases leaving said recuperated turbine whereby an air-blown gasifier is operated at a high temperature to enable slagging of the ash and salts contained in the aqueous slurry.

13. An apparatus for the burning of carbonaceous fuel for the production of energy comprising:
- a gasifier into which an aqueous coal slurry comprising at least 55% by weight of water is introduced;
- a flow drier/separator, wherein materials exiting the gasifier are dried and separated into a gaseous component and a dried slurry material, and wherein the dried slurry material is fed back to the gasifier;
- a cooling/cleaning device, wherein the gaseous component from said drier/separator is cooled and cleaned to produce a cooled and cleaned gas; and
- a recuperator turbine/combustion device for generating energy using the cooled and cleaned gas.

14. An apparatus for the burning of carbonaceous fuel for the production of electrical energy comprising:
- a gasifier into which an aqueous coal slurry comprising at least 55% by weight of water is introduced;
- a flow drier/separator, wherein materials exiting the gasifier are dried and separated into a gaseous component and a dried slurry material, and wherein the dried slurry material is fed back to the gasifier;
- a cooling/cleaning device, wherein the gaseous component from said drier/separator is cooled and cleaned to produce a cooled and cleaned gas; and
- a gas turbine generation unit comprising a compressor, an expansion stage, a gas turbine generator, and a combustor mechanism, the arrangement being such that combustion and process air passes from said compressor in a first stream to the gasifier and in a second stream to the combustor, where the second stream is combined with the cooled and cleaned gas, the combined gasses then being passed to said expansion stage of said gas turbine generator, and converted therein into electrical energy.

* * * * *